United States Patent Office 3,166,532
Patented Jan. 19, 1965

3,166,532
PROCESS FOR POLYMERIZING AN AROMATIC
DIALDEHYDE
Wilfred Sweeny, Wycliffe, Wilmington, Del., assignor to
E. I. du Pont de Nemours and Company, Wilmington,
Del., a corporation of Delaware
No Drawing. Filed June 14, 1961, Ser. No. 116,971
9 Claims. (Cl. 260—67)

This invention relates to a novel method for the preparation of polyesters and copolyesters. More particularly it relates to the preparation of high molecular weight, fiber- and film-forming polyesters and copolyesters by coupling of dialdehydes through a novel catalytic process.

It is well known that aromatic dialdehydes undergo a disproportionation reaction in the presence of aqueous alkali metal bases to form equal amounts of the corresponding acid and alcohol as products. This is equivalent to a simultaneous oxidation-reduction of one molecule of aldehyde by another of the same species. The reaction is known as the Cannizzaro reaction. The reaction applied to benzaldehyde is illustrated below.

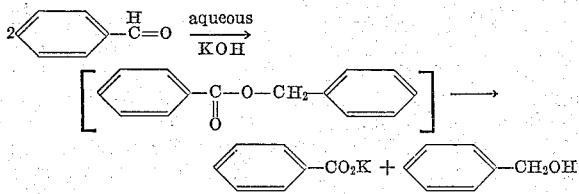

It has been postulated and shown that an ester is one intermediate of the reaction.

When the same reaction is carried out under anhydrous conditions, using metal alcoholates as catalysts, the postulated ester intermediate is the major product. The reaction under these conditions is known as the Tischenko reaction.

Both reactions involve base catalyzed coupling of aldehydes. It must be noted that an essential feature of the reaction involves the use of hydoxide or alkoxide catalyst systems.

Both reactions have been applied to monoaldehydes to form esters. Although the application of these reactions to dialdehydes would offer a novel and simple route to the preparation of polyesters and copolyesters, attempts to accomplish this have met with little success.

It is an object of this invention to prepare high molecular weight, fiber- and film-forming polyesters and copolyesters from aromatic dialdehydes. It is a further object of this invention to provide a novel catalytic process for producing said polyesters from aromatic dialdehydes.

These objects are accomplished by polymerizing aromatic dialdehydes, i.e. compounds having two nuclear bonded aldehyde groups, in the presence of a catalytic amount of a metal alkyl, whereby the dialdehydes undergo a coupling reaction with the formation of high molecular weight, fiber- and film-forming polyesters. Copolyesters can be produced by polymerizing two or more different dialdehydes.

Illustrative of suitable dialdehydes for the purpose of the present invention are terephthalaldehyde and isophthalaldehyde representing mononuclear dialdehydes; 4,4-biphenyl-dicarboxaldehyde, 4,4'-methylene dibenzaldehyde, 4,4'-oxydibenzaldehyde, and 4,4'-isopropylidene dibenzaldehyde representing unfused dinuclear dialdehydes; and naphthalenedicarboxaldehyde representing fused dinuclear dialdehydes. The general formulae for these groups are as follows:

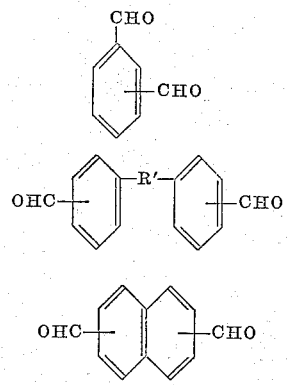

where R' is either a direct bond or a divalent radical.

The materials which are useful as catalysts in the instant process are metal alkyls having the general formula: $M(R)_n$ where R is a lower alkyl radical having from 1 to 6 carbon atoms, such as ethyl, isopropyl, and isobutyl, M is a metal of Group I to III of the Periodic Table such as lithium (Group I), zinc (Group II), and aluminium (Group III) and $n$ is the valence of the metal. It is obvious, too, that mixed alkyl groups or mixtures of the metal alkyls herein described are also effective catalysts. A catalytic amount up to about 20% based on the weight of the dialdehyde, may be used though lower amounts are generally preferred. Preferred metals are aluminum and zinc.

The polymers formed by polymerization of the dialdehydes, according to the process herein described, are polyesters as confirmed by infra-red spectroscopy and by hydrolysis to the acid and alcohol products which would be expected from a simple Cannizzaro reaction on the starting dialdehyde.

While the polymerization temperature and pressure is not critical temperatures of about 20–140° C. and substantially atmospheric pressures are generally used. Sub or superatmospheric pressures may be used. Preferably the reaction is carried out at about 80° C., in a suitable solvent or reaction medium. A cycloaliphatic reaction medium, such as cyclohexane, is ordinarily used. Aromatic solvents, such as toluene, are quite satisfactory.

The preparation of polymers by the process of this invention is illustrated by the following examples.

*Example I*

A suspension of 2.5 g. terephthalaldehyde in 35 cc. dry cyclohexane was stirred at 82° C. under nitrogen. To this was added 0.5 cc. of a 0.5 M. solution of triisobutyl aluminum in decalin. The suspension turned yellow. After stirring for 16 hours at 80–85° C., a light yellow polymer was apparent. This was filtered and washed with methanol containing a small amount of aqueous hydrochloric acid to remove any catalyst residues and remaining terephthalaldehyde. After drying at 60° C. under vacuum, 2.25 g. of light yellow polymer resulted. This polymer had a polymer melt temperature of 135–140° C. Long flexible fibers, which could be knotted without breaking, were drawn from molten polymer at 180° C. The polymer was soluble in chloroform. Infra-red spectrographic examination confirmed that the polymer was a polyester composed mostly of benzyl ester groupings.

The polymer had an inherent viscosity of 0.21 as measured in a 40/60 weight percent mixture of tetrachloroethane and phenol.

*Example II*

Repeating the above polymerization at room temperature instead of 80–85° C. gave 0.35 g. of the same polymer.

*Example III*

Under nitrogen, 2.5 g. of terephthalaldehyde was suspended in 50 cc. of dry cyclohexane. The suspension was warmed to 80° C. and 0.5 cc. of a solution (0.82 N) of triethylaluminum in cyclohexane was added. After stirring overnight at 80° C. under nitrogen, a light yellow suspension remained in the flash. Methanol (100 cc.) was added to the reaction mixture and the polymer was then filtered, washed with an additional 200 cc. of methanol, and air dried. The polymer was purified by dissolving it in 20 cc. of trifluoroacetic acid containing 1 cc. of tetrachloroethane, filtering the solution, and re-precipitating the polymer by adding the solution to a large excess of methanol. The polymer was then washed with excess methanol and dried at 60° C. under vacuum. The yield was 1.9 g. of white polymer, having an inherent viscosity (measured in a 40/60 wt. percent mixture of tetrachloroethane and phenol) of 0.31. This polyester could be melt-pressed at 120° C. to give a flexible film.

*Example IV*

Example III was repeated using 0.5 cc. of pure diethylzinc as catalyst in place of the catalyst solution. After purification, the yield was 2.0 g. of polyester, having an inherent viscosity (measured in a 40/60 wt. percent mixture of tetrachloroethane and phenol) of 0.19.

*Example V*

Terephthalaldehyde was polymerized by the procedure of Example III, except that butyllithium dissolved in pentane was used as the catalyst solution and toluene as solvent for the terephthalaldehyde.

*Example VI*

In 60 cc. of dry toluene, 2.5 g. of 4,4'-biphenyldicarboxaldehyde was suspended and the suspension was warmed to 80° C. under nitrogen. A yellow solution resulted. To this, 0.1 cc. of a solution (0.82 N) of triethylaluminum in cyclohexane was added. The solution became yellow and opaque. After heating it for 2 hours at 80° C., an additional 0.05 cc. of catalyst solution was added. Heating was continued overnight at 80° C. and a yellow precipitate formed. This was diluted with one liter of hot ethanol and filtered to give a polymeric yellow solid, which was then washed with acetone and air dried. The polyester was purified by dissolving it in a mixture of 20 cc. of trifluoroacetic acid and 10 cc. of tetrachloroethane, filtering, and precipitating into excess ethanol. After washing with acetone and drying at 60° C. under vacuum, a yield of 0.2 g. of light yellow polymer was obtained.

*Example VII*

Example VI was repeated, using 60 cc. of decalin in place of toluene. The yield was 1.5 g. of light yellow polymer, having an inherent viscosity (measured in a 40/60 wt. percent mixture of tetrachloroethane and phenol) of 0.08 and a polymer melt temperature of 210° C. This polyester gave a brittle film on pressing at 200° C.

The process of this invention provides linear polyesters and copolyesters in a simple and efficient manner. Since the process does not involve the splitting off of water or other by-products of reaction, the attendant problems of removing such compounds are eliminated. The polyesters and copolyesters, which are obtained, find use in those applications commonly known for high molecular weight, linear polyesters. Thus the molten polymers may be converted into useful fibers and films by conventional melt-spinning or melt-casting techniques. They may also be used as coating materials for the protection of various substrates. Other uses will be apparent to those skilled in the art.

I claim:

1. A novel catalytic process comprising polymerizing in a reaction medium an aromatic dialdehyde in the presence of a catalytic amount of up to about 20% by weight based upon the dialdehyde of a metal alkyl of the formula $M(R)_n$ where R is a lower alkyl radical having from 1 to 6 carbon atoms, M is a metal of Group I to III of the Periodic Table and $n$ is the valence of the metal.

2. The process of claim 1 wherein an aluminum alkyl is employed as the catalyst.

3. The process of claim 1 wherein a zinc alkyl is employed as the catalyst.

4. A novel catalytic process comprising polymerizing in a reaction medium a mononuclear aromatic dialdehyde in the presence of a catalytic amount of up to about 20% by weight based upon the dialdehyde of a metal alkyl of the formula $M(R)_n$ where R is a lower alkyl radical having from 1 to 6 carbon atoms, M is a metal of Group I to III of the Periodic Table and $n$ is the valence of the metal.

5. A novel catalytic process comprising polymerizing in a reaction medium terephthalaldehyde in the presence of up to about 20% by weight based on the dialdehyde of triisobutyl aluminum.

6. A novel catalytic process comprising polymerizing in a reaction medium terephthalaldehyde in the presence of up to about 20% by weight based on the dialdehyde of triethylaluminum.

7. A novel catalytic process comprising polymerizing in a reaction medium terephthalaldehyde in the presence of up to about 20% by weight based on the dialdehyde of diethylzinc.

8. A novel catalytic process comprising polymerizing in a reaction medium terephthalaldehyde in the presence of up to about 20% by weight based on the dialdehyde of butyllithium.

9. A novel catalytic process comprising polymerizing in a reaction medium 4,4'-biphenyldicarboxaldehyde in the presence of up to about 20% by weight based on the dialdehyde of triethylaluminum.

References Cited in the file of this patent

UNITED STATES PATENTS 2,848,437    Landsdorf et al. _____ Aug. 19, 1958

OTHER REFERENCES

Lenz, et al.: Journal of Organic Chemistry, vol. 25, pages 813–817, May 1960.